Patented May 23, 1944

2,349,765

UNITED STATES PATENT OFFICE 2,349,765

PREPARATION OF BENZOTETRONIC ACID

Robert S. Shelton, Mariemont, and Marcus G. Van Campen, Jr., Silverton, Ohio, assignors to The Wm. S. Merrell Company, Reading, Ohio, a corporation of Delaware No Drawing. Application October 15, 1941, Serial No. 415,143

3 Claims. (Cl. 260—344.6)

This invention relates to a new process for the manufacture of benzotetronic acid, a useful intermediate for the preparation of various other chemicals.

In accordance with the present invention, benzotetronic acid is produced by heating methyl acetyl salicylate with an anhydrous alcoholate substantially free from alcohols, with or without the use of an inert, usually high boiling, solvent. The temperature should be sufficiently high for the reaction to proceed with reasonable speed, but should not be so high as to cause pyrolysis. A reaction temperature of about 150° C. is advantageously used. Somewhat higher temperatures can be used, as long as pyrolytic decomposition is avoided. Lower temperatures can also be used, but at lower temperatures, the reaction proceeds more slowly.

The invention will be further illustrated by the following example, but it is not limited thereto.

*Example.*—20 parts of methyl acetyl salicylate are heated to 160–180° C. 5 parts of solid sodium methoxide are added slowly, while the temperature is maintained at about 150° C. The mass suddenly solidifies after the reaction is substantially completed, and it is then cooled and extracted with 200 parts of water. The extract is acidified, and the resulting oil is separated and crystallized from hot water or dilute alcohol. The resulting product usually melts at about 203° C. By further recrystallization, a purified product melting at 210° C. may be produced.

Instead of sodium methoxide, sodium ethoxide, propoxide, or other alkoxide may be used, as may the alkoxides of other alkali metals. Sodium methoxide, because readily available, is preferred. Of course, it must be free from water and from alcohols, as must the methyl acetyl salicylate.

In some cases, it is advantageous to dissolve or suspend the methyl acetyl salicylate in a suitable inert solvent, advantageously a high boiling solvent such as xylol, solvent naphtha or the like, although more volatile solvents, such as benzene, carbon tetrachloride, ligroin, etc., may be used. With the lower boiling solvents, the reaction will ordinarily be carried out under pressure, to provide the desired high temperature required for the reaction to proceed with reasonable rapidity. The methyl acetyl salicylate will ordinarily be dissolved in the solvent, or suspended therein, and the sodium methoxide then added to the hot solution or suspension with vigorous stirring. Where a solvent is used, when the reaction has proceeded to completion, the suspension or solution is cooled, and the benzotetronic acid filtered off, dissolved in water, and then purified as described in the example.

We claim:

1. The method of preparing benzotetronic acid which comprises reacting methyl acetyl salicylate with a sodium alkoxide and in the absence of metallic sodium.

2. The method of preparing benzotetronic acid which comprises reacting methyl acetyl salicylate with sodium methoxide and in the absence of metallic sodium.

3. The method of preparing benzotetronic acid which comprises reacting methyl acetyl salicylate with an alkali metal alkoxide and in the absence of metallic alkali metal.

ROBERT S. SHELTON.
MARCUS G. VAN CAMPEN, Jr.